United States Patent [19]

Jacob

[11] 3,966,884
[45] June 29, 1976

[54] SYNTHESIS OF WOLLASTONITE FROM NATURAL MATERIALS WITHOUT FUSION

[75] Inventor: Claude J. Jacob, Olivet, France

[73] Assignee: Bureau de Recherches Geologiques et Minieres, Paris, France

[22] Filed: June 20, 1974

[21] Appl. No.: 481,427

[30] Foreign Application Priority Data
June 20, 1973    France............................. 73.22459

[52] U.S. Cl.............................. 423/331; 106/63; 106/73.5; 106/69; 423/326
[51] Int. Cl.²......................................... C01B 33/24
[58] Field of Search .......... 423/326, 331; 106/73.5, 106/46, 69, 100, 58, 63; 264/56, 65

[56] References Cited
UNITED STATES PATENTS

| | | | |
|---|---|---|---|
| 2,621,131 | 12/1952 | Lathe.................................. | 106/58 |
| 3,379,523 | 4/1968 | Chaklader............................ | 264/65 |
| 3,381,064 | 4/1968 | Yamaguchi et al................. | 106/100 |
| 3,501,324 | 3/1970 | Kubo.................................. | 423/331 |
| 3,520,705 | 7/1970 | Shido et al.......................... | 106/46 |
| 3,782,981 | 1/1974 | Rostoker............................. | 106/63 |

OTHER PUBLICATIONS
Hurlbut, C; Dana's Manual of Minerology; New York, 1941, p. 326.

*Primary Examiner*—Walter R. Satterfield
*Attorney, Agent, or Firm*—Sughrue, Rothwell, Mion, Zinn & Macpeak

[57] ABSTRACT

The present invention relates to a process for the synthesis of crystallized wollastonite from a natural material having a high content of calcium carbonate and silica.

According to the invention, silica or calcium carbonate are added to the natural material so that the mixture has a silica/carbonate content which varies less than 10% from the value of the stoichiometric ratio, the silica being introduced preferably in the form of crystallized silica having a large surface area, for example, kieselguhr. Crystallized $CaSiO_3$ is obtained between 1000°C and 1100°C and high-temperature wollastonite, preferably between 1100° and 1200°C, according to the reaction:

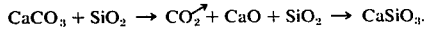

$$CaCO_3 + SiO_2 \rightarrow CO_2 + CaO + SiO_2 \rightarrow CaSiO_3.$$

The present invention may be used to produce wollastonite intended in particular for use in road surfaces and for the charging materials required in the rubber and plastics industry.

6 Claims, No Drawings

SYNTHESIS OF WOLLASTONITE FROM NATURAL MATERIALS WITHOUT FUSION

The present invention relates to a process for producing crystallized wollastonite without fusion from a natural material having a high calcium carbonate and silica content.

The wollastonite obtained according to the present invention has the advantage of being particularly useful for the preparation of ceramic materials and as a mineral charge in numerous industries such as plastics and rubber and for use in the production of paints and road surfaces, etc.

The existing processes generally necessitate the melting of the raw materials or employ hydrothermal synthesis using different raw materials which have to be selected, mechanically prepared and mixed under strict proportioning and homogenizing conditions. In the first case, apart from necessitating the use of considerable energy owing to the high heat consumption, the melting process is characterized by the fact that it does not immediately produce a totally crystallized wollastonite, but a product having a vitreous stage associated with a crystalline stage consisting of high temperature wollastonite. This vitreous crystalline form restricts its commercial and industrial uses and a totally crystallized form can only be obtained at the cost of additional processing. In the second case, that of hydrothermal synthesis, the process has the essential disadvantage of necessitating the use of an autoclave to render soluble the silica and to obtain calcium hydrosilicates. These must then be dehydrated at a relatively high temperature so that they can finally be transformed into wollastonite.

The main object of the present invention is a process for preparing crystallized wollastonite wherein the base product is a chalk, the silica or carbonate content of which varies from 30–70%. When the silica/calcium carbonate ratio varies more than 10% from the stoichiometric ratio, it is necessary to add to the base product either other chalks having different silica and calcium carbonate proportions or calcium carbonate or silica in the form of kieselguhr, for example, so as to bring the variation from the stoichiometric ratio to within 10%. In addition, in this process, the product is reduced to a granulometry lower than 2 mm, the mixture is rendered homogeneous and is subjected to a temperature of 1000° – 1100°C to obtain crystallized wollastonite and to a higher temperature, generally 1100° – 1200°C, but which can reach 1500°C, to obtain crystallized pseudo-wollastonite without melting the reaction products.

Accordingly, the main object of this process is essentially to employ diffusion reactions in the solid state to produce directly, according to the temperature employed, either wollastonite known as low-temperature wollastonite or the high-temperature pseudo-wollastonite.

Another object of the invention is to improve the yield of the reaction by adding very small quantities of mineralizing agents comprising alkaline cations or cations of alkaline earths.

It has been found, for example, that by adding less than 0.5% lithium fluoride, for example, it is possible to reduce the thermal treatment by several hours.

Other objects, features and advantages of the present invention will be made apparent from the following description indicating, by way of example only, certain methods of implementing the process.

According to the invention, the reaction by diffusion in the solid state may be expressed in the following way, eliminating the intermediate stage for obtaining a dicalcic silicate:

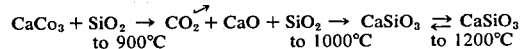

$$CaCo_3 + SiO_2 \underset{\text{to } 900°C}{\rightarrow} CO_2\nearrow + CaO + SiO_2 \underset{\text{to } 1000°C}{\rightarrow} CaSiO_3 \underset{\text{to } 1200°C}{\rightleftarrows} CaSiO_3$$

If the temperature continued to be raised, liquid wollastonite would be obtained at a temperature above 1540°C. In the process employed, the temperature is maintained between 1000° and 1100°C to obtain the low-temperature crystallized wollastonite and this temperature is raised to between 1100° and 1500°C to obtain the crystallized pseudo-wollastonite known as high-temperature wollastonite or it is combined in accordance with the proportion of existing impurities, with 10 – 15% by weight melilite relative to the total weight of the product obtained. The presence of the melilite does not unfavorably affect the industrial applications of this product.

To obtain this result without having to use a prohibitive number of calories to obtain an acceptable yield, the only solution when starting from the base products calcium carbonate and silica would have been to carry out an initial fine-grinding operation and to blend the products perfect - which ultimately would have increased the cost price to that of producing wollastonite by the melting and hardening method.

According to the invention this difficulty is eliminated by the selection as reagents of chalk products comprising silica in opal form from sponge spikelets distributed in the rock.

Numerous tests demonstrated the efficacy of this process. This efficacy can be explained, on the one hand, by the fact that the calcium carbonate is in the form of small particles of calcite of chalk and, on the other hand, by the high reactivity of the silica in the imperfectly crystallized opal form and by the presence of the same in the form of small particles dispersed within the carbonate.

By way of example, a series of tests was carried out on a chalk sample having the following composition:
  calcite 51.4%
  opal 44.1%
  quartz 4.5%

The sample was heated to 1080°C during a variable number of hours. It was possible to detect the formation of wollastonite from the end of the first hour onwards. There was then a rapid increase in the proportion of wollastonite/quartz with opal still remaining owing to the high content thereof. Calcium oxide which is present in large quantities at the end of 5 hours of heating, decreases very rapidly through being combined with opal to form wollastonite. The presence of dicalcic silicate is still observed with the formation of calcium oxide. The quantity of this intermediate product decreases less rapidly than calcium oxide.

During a second series of tests it was found that the yield increased by using samples in which the proportions of $SiO_2$ and $CaCO_3$ are the exact stoichiometric proportions $CaCO_3 = 62.5\%$ and $SiO_2 = 37.5\%$. Thereafter, either calcium carbonate, preferably in chalk form, can be added if the sample does not contain sufficient thereof or silica can be added, preferably having a suitable physical structure, that is, crystallized silica having a large surface area such as kieselguhr, opal or globula silica.

In this way, starting from four separate samples of chalks No. 1, 2, 3 and 4, three compounds obtained from these samples were tested: composition A consisting of 100% of sample No. 4, composition B obtained by mixing 25% of sample No. 2, 40% of sample No. 3 and 35% of sample No. 4, compound C consisting of 50% of sample 1 and 50% of sample No. 2. The chemical composition of the samples and mixtures are the following:

|  | No 1 | No 2 | No 3 | No 4 = A | B | C |
|---|---|---|---|---|---|---|
| $SiO_2$ | 30.50 | 31.60 | 37.40 | 33.45 | 34.54 | 31.25 |
| $Al_2O_3$ | 3.10 | 1.45 | 2.15 | 1.74 | 1.86 | 2.25 |
| $Fe_2O_3$ | 0.82 | 0.78 | 1.02 | 0.50 | 0.78 | 0.80 |
| CaO | 33.60 | 34.50 | 30.30 | 33.40 | 32.43 | 34.05 |
| HgO | 1.00 | 1.10 | 1.10 | 1.00 | 1.06 | 1.05 |
| $K_2O$ | 0.43 | 0.31 | 0.64 | 0.34 | 0.45 | 0.40 |
| $Na_2O$ | 0.17 | 0.23 | 0.13 | 0.08 | 0.14 | 0.20 |
| $TiO_2$ | 0.19 | 0.12 | 0.17 | 0.10 | 0.10 | 0.15 |
| $CO_2$ | 26.00 | 27.40 | 24.10 | 26.54 | 25.77 | 26.70 |
| $H_2O$ | 1.65 | 0.70 | 1.00 | 1.25 | 1.01 | 1.17 |

Compounds A, B and C correspond to the following mineralogical compositions:

| Composition | A | B | C |
|---|---|---|---|
| Calcite | 60 | 59 | 60 |
| Opal | 30 | 31 | 27 |
| Quartz | 2 | 2 | 2 |
| Impurities (montmorillonite +clinoptilolite) | 8 | 8 | 11 |

The tests showed that the yield was better in the case of compounds A and B, of which the $SiO_2$ and $CaCO_3$ contents were closer to the precise stoichiometric proportions. In contrast, the results are not as good with compound C where the proportion of $SiO_2/CaCO_3$ varies more from the stoichiometric ratio. The total amount of oxides other than $SiO_2$, CaO and $CO_2$ and in impurities must be between 0 and 10% by weight.

The importance of opal was demonstrated by measuring the specific surface of this constituent heated in advance to 570°C to estimate this value close to the reaction and after degassing at 250°C. The value obtained is very high since it is in the order of 70 m²/g.

A third series of tests showed an increase in the yield by incorporating less than 5% of one of the following compounds: KCl, $CaCl_2$, $CaF_2$, NaCl, NaF, $Na_2CO_3$, $Na_2SiO_3$, $Na_2WO_4$, LiF and $Li_2CO_3$. It was possible to ascertain, in particular, that the results were satisfactory with contents of 0.2 of the monovalent cation per mol. of $CaSiO_3$ formed, or in percent: NaF = 0.52%, LiF = 0.32%, $Na_2CO_3$ = 0.65%, $Li_2CO_3$ = 0.45%, $Na_2SiO_3$ = 1.5% and $Na_2WO_4$ = 1.73%, the best results being obtained with fluoride anions and the lithium cation.

It should be noted that excellent results are even obtained with contents of 0.1 – 0.5% lithium carbonate, the amount of wollastonite formed increasing as a function of the quantity of lithium carbonate. Simultaneously, the other minerals present initially in the mixture: quartz, opal, decrease. The minerals corresponding to the intermediate stages of the reaction: larnite, rankinite, also decrease with the exception of melilite which increases slightly at above 1100°C.

It was also noted that if the mixture was heated to 1150°C instead of to a temperature below 1100°C, pseudo-wollastonite is formed together with approximately 15% by weight melilite relative to the total product obtained, depending on the impurities present. The crystallization stage of pseudo-wollastonite is obtained with any one of the mineralizing agents cited above: $Li_2CO_3$, LiF, $Na_2CO_3$, NaF; the content of the mineralizing agents being 0.5% in the experiments.

The tests showed that when the chalk selected contains an aluminum content in excess of 3%, improved yields could be obtained by lowering this content to less than 3% by simply intermixing other chalks having a low aluminum content.

In addition to incorporating mineralizing agents and chalks for correcting the proportion of $SiO_2$ to $CaCO_3$ or to decrease the content of $Al_2O_3$, it is possible to include an initial pressing and fritting operation designed to reduce the volume of the pores and to increase the contact surfaces and the volume of the grains to improve the diffusion process in the solid state.

By way of example, by taking samples of calcareous tufa of Turonian having the composition defined above and situated in certain carefully selected geological formations such as those of the South West area of the Paris Basin, it was possible to obtain the following results after reduction to a granulometry lower than 1.5 mm:

Samples D: production of crystallized wollastonite from products having an identical chemical and mineralogical composition to composition A or B, by heating at a temperature of 1000° – 1100°C for 3 – 5 hours and adding 0 – 0.5% lithium or sodium chloride, carbonate or fluoride.

Sample E: production of crystallized pseudo-wollastonite together with 10 – 15% melilite from products having identical chemical and mineralogical compositions to compositions A or B by heating to a temperature of 1100° – 1200°C for 1 – 3 hours adding 0 – 0.5% lithium or sodium chloride, carbonate or fluoride.

Applications for the process result from the reduction in cost of the wollastonite obtained and the increase in its quality since the use of wollastonite in ceramics offers numerous advantages: pottery tiles having improved thermal and mechanical resistance and, more especially, a reduction in the firing time from 20 – 70 hours to 1 – 2 hours. In addition, the wollastonite obtained may be incorporated in road surfaces, increasing the safety thereof by rapidly absorbing oil spots. It may also be used as a charge in the plastics and rubber industries.

What is claimed is:

1. A process for producing low-temperature wollastonite wherein a natural chalk-containing material which comprises silica in the form of sponge spikelets and calcium carbonate in amounts within 10% of the stoichiometric ratio (a) is mixed with a mineralizing agent selected from the group consisting of NaCl, NaF, $Na_2CO_3$, $Na_2SiO_3$, $Na_2WO_4$, KCl, $CaCl_2$, $CaF_2$, LiF, LiCl and $Li_2CO_3$, (b) said mixture is reduced in granulometry to lower than 2 mm and rendered homogeneous, and (c) said mixture of (b) is heated to a temperature of between 1000° – 1100°C for 1 to 5 hours.

2. The process as claimed in claim 1, wherein said natural chalk-containing material is obtained by adding silica in the form of opal, kieselguhr or globular silica to naturally-occurring chalk.

3. The process as claimed in claim 1, wherein said natural chalk-containing material is obtained by adding calcium carbonate to naturally-occurring chalk.

4. The process as claimed in claim 1, wherein said natural chalk-containing material contains 40–70% calcite, 30–70% opal and 0–15% of minerals selected from the group of quartz, montmorillonite and clinoptilolite.

5. The process as claimed in claim 1, wherein said granulometry reduction in step (b) is obtained by pressing and fritting said mixture of (a), thereby increasing the contact surfaces and volume of the natural chalk-containing material.

6. The process as claimed in claim 1, wherein the natural chalk in said chalk-containing material consists of 30–70% silica and 30–70% calcium carbonate.

* * * * *

UNITED STATES PATENT AND TRADEMARK OFFICE
CERTIFICATE OF CORRECTION

PATENT NO. : 3,966,884
DATED : June 29, 1976
INVENTOR(S) : Claude J. JACOB

It is certified that error appears in the above-identified patent and that said Letters Patent are hereby corrected as shown below:

Column 2, line 30 - delete [perfect] and insert -- perfectly --

Column 3, line 16 - under No. 1 delete [30.50] and insert -- 30.90 -- line 18 - delete [HgO] and insert -- MgO -- line 19 - under No. 1 delete [0.43] and insert -- 0.48 --

Column 6, line 13 - after "said" insert -- natural --

Signed and Sealed this

Twenty-sixth Day of October 1976

[SEAL]

*Attest:*

RUTH C. MASON
*Attesting Officer*

C. MARSHALL DANN
*Commissioner of Patents and Trademarks*